United States Patent [19]
Hattori et al.

[11] Patent Number: 5,548,672
[45] Date of Patent: Aug. 20, 1996

[54] REINFORCED MULTICORE OPTICAL FIBER COUPLER

[75] Inventors: Tomoyuki Hattori; Hiroshi Suganuma; Eisuke Sasaoka; Hiroaki Takimoto, all of Kanagawa, Japan

[73] Assignee: Sumitomo Electric Industries, Ltd., Osaka, Japan

[21] Appl. No.: 391,687

[22] Filed: Feb. 21, 1995

Related U.S. Application Data

[63] Continuation-in-part of Ser. No. 188,824, Jan. 31, 1994, abandoned.

[30] Foreign Application Priority Data

Feb. 2, 1993 [JP] Japan .................. 5-15134

[51] Int. Cl.⁶ .................................... G02B 6/26
[52] U.S. Cl. ................ 385/43; 385/96; 385/99
[58] Field of Search ................... 385/43, 48, 51, 385/95, 96, 99, 97, 98, 41, 42, 44, 45, 46

[56] References Cited

U.S. PATENT DOCUMENTS

| 4,778,242 | 10/1988 | Ota et al. ............................ 385/96 |
| 4,869,570 | 9/1989 | Yokohama et al. ............... 385/43 |
| 4,906,068 | 3/1990 | Olson et al. ....................... 385/43 |
| 5,098,459 | 3/1992 | Fukuma et al. ................... 385/51 |
| 5,167,685 | 12/1992 | Fukuma et al. ................... 385/96 |
| 5,247,598 | 9/1993 | Takimoto et al. ................. 385/99 |
| 5,261,018 | 11/1993 | Suganuma et al. ................ 385/51 |
| 5,293,440 | 3/1994 | Miles et al. ....................... 385/51 |
| 5,295,219 | 3/1994 | Koya et al. ....................... 385/134 |

FOREIGN PATENT DOCUMENTS

| 0475494 | 3/1992 | European Pat. Off. . |
| 0501297 | 9/1992 | European Pat. Off. . |
| 0507243 | 10/1992 | European Pat. Off. . |
| 0525743 | 2/1993 | European Pat. Off. . |
| 63-194208 | 8/1988 | Japan ............................ 385/96 |
| 63-254406 | 10/1988 | Japan . |
| 64-24308 | 2/1989 | Japan . |
| 64-63907 | 3/1989 | Japan . |
| 1-120510 | 5/1989 | Japan . |
| 1295211 | 11/1989 | Japan . |

*Primary Examiner*—John Ngo
*Attorney, Agent, or Firm*—Cushman Darby & Cushman, L.L.P.

[57] ABSTRACT

A reinforced structure for a multicore optical fiber coupler wherein a longitudinal coating resin of first and second multicore optical fibers, each having a plurality of optical fiber strands positioned in parallel arrangement to each other and each collectively coated with a respective coating resin, is partially removed so as to expose glass portions of the optical fiber strands of each of the optical fibers. The exposed glass portions are then fused and extended. The fused and extended portions are then accommodated in a plurality of grooves formed in a reinforcing casing. The non-extended portions, which are located on opposite ends of the fused and extended portions in the extending direction, are also accommodated on the surface of the reinforcing casing. The optical fibers are secured to the reinforcing casing with adhesive, which is applied to the non-extended portions of the fibers. The reinforcing casing is preferably made of a material having substantially the same coefficient of linear expansion as that of quartz.

22 Claims, 5 Drawing Sheets

PRIOR ART

REINFORCED MULTICORE OPTICAL FIBER COUPLER

This application is a continuation-in-part of Ser. No. 08/188,824, filed Jan. 31, 1994, now abandoned.

BACKGROUND OF THE INVENTION

1. Field of the Invention

The present invention relates generally to a reinforced multicore optical fiber coupler formed by fusing and extending a plurality of optical fibers.

2. Description of the Related Art

It has been recognized that, due to the small diameter of optical fiber couplers (e.g., preferably sized to have an outer diameter on the order of 10 µm), an external force or temperature change can cause its propagation characteristics to change and, in some cases, cause physical damage to the coupler.

A now conventional way of dealing with this problem has been to use a reinforcing base having substantially the same coefficient of linear expansion as that of quartz. The reinforcing base protects the optical fibers from external forces so as to allow them to maintain a stable characteristic. One example of such a reinforcing base is the plate-like member disclosed in Japanese Utility Model Unexamined Publication No. Sho. 64-24308. Another example of such a reinforcing base is the pipe-like member disclosed in Japanese Patent Unexamined Publication No. Sho. 64-63907. A thermosetting or ultraviolet setting adhesive of an epoxy group, an urethaneacrylate group, or a cyanoacrylate group has been used as a fixing adhesive in such conventional optical fiber couplers.

Recently, advances in the technology of optical fiber communication lines have resulted in systems having a higher density of such lines, as well as an increase in the number of optical fiber couplers used. However, these advances have caused further problems to be overcome. Conventional couplers are constituted by a pair of optical fibers. By increasing the density of the optical fiber communication lines and the required number of optical fiber couplers, the lines and couplers take up a considerable amount of space. Moreover, complications arise in accommodating the residual length of the optical fibers on the opposite ends of the optical fiber coupler.

To overcome these problems, it is known to form an optical fiber coupler constituted by two optical fibers fixed on a reinforcing material. A plurality of reinforcing materials are accommodated in a single package. The optical fibers outside the package are formed into a tape-like multicore coated optical fiber bundle. An example of this conventional arrangement is disclosed in Japanese Patent Unexamined Publication No. Hei. 1-295211. Further known in the art is an arrangement in which optical fiber couplers, each containing two optical fibers, are arranged on a comb-tooth-like fixing member having a plurality of grooves that provide reinforcement. An example of such an arrangement is disclosed in Japanese Patent Unexamined Publication No. Sho. 63-254406.

In the conventional arrangements disclosed in Japanese Patent Unexamined Publication Nos. Hei 1-295211 and Sho. 63-254406, however, the optical fibers mounted on the optical fiber couplers are of a high density. Due to the high density of the optical fibers, a long time is required for forming a multicore optical fiber coupler according the foregoing arrangements.

To overcome the above mentioned problem of delay in forming the multicore optical fiber coupler, it is known in the art to directly produce a multicore optical fiber coupler from multicore coated optical fibers. An example of this method is disclosed in Japanese Patent Unexamined Publication No. Hei 1-120510. When coated optical fibers are fixed by using a reinforcing base, the whole non-extended portions and coating portions comprising the glass portions of the coated optical fibers are fixed by using an adhesive. This functions to thereby produce a multicore optical fiber coupler. Consequently, a problem arises in that deformation of the adhesive causes the transmission characteristic of the optical fiber coupler to undergo remarkable change when subjected to external forces, such as a temperature change and high humidity.

SUMMARY OF THE INVENTION

It is, therefore, an object of the present invention to provide a reinforcing arrangement for a multicore optical fiber coupler that is not adversely affected by variations in the surrounding environment or by external forces imparted upon the coupler.

Accordingly, the present invention discloses an optical fiber coupler that includes a first multicore optical fiber having a plurality of optical fiber strands positioned in a substantially parallel arrangement to each other and collectively coated with a common coating resin. The coating resin of the first multicore optical fiber is partially removed so as to expose glass portions of the optical fiber strands and to form non-exposed portions on opposite ends of the exposed portions in the longitudinal direction. The coupler further includes a second multicore optical fiber having a plurality of optical fiber strands positioned in a substantially parallel arrangement to each other and collectively coated with a common coating resin. The coating resin of the second multicore optical fiber is similarly partially removed to provided exposed glass portions and non-exposed portions on opposite ends thereof in the longitudinal direction. The exposed glass portions of the first multicore optical fiber are arranged to be superposed with respect to corresponding exposed glass portions of the second multicore optical fiber. A fused and extended portion of the coupler is provided by fusing and thereafter extending the corresponding exposed glass portions. The corresponding optical fiber strands can then be respectively accommodated in a plurality of grooves formed in a reinforcing casing. The reinforcing casing is made from a material having substantially the same coefficient of linear expansion as that of quartz. Preferably, adhesive is included for securing the optical fibers in place and for preventing any direct contact between the optical fibers and the reinforcing casing.

The present invention further discloses a method for making the above-described optical fiber coupler.

This and other objects, features and advantages of the present invention will become apparent from the following detailed description when taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE INVENTION

A detailed description of the present invention is provided below. As used in this patent, "optical fiber strand" is defined as an optical fiber of quartz-group glass having a protective coating layer formed thereon. Generally, the protective coating layer preferably comprises a two-layer coating of a soft material having a Young's modulus not larger than 1 kg/mm$^2$ and a hard material having a Young's modulus not less than 10 Kg/mm$^2$. Further, the optical fiber may contain an additional colored layer as the outermost layer of the protective coating layer for the purposes of discrimination.

Figure 3A:
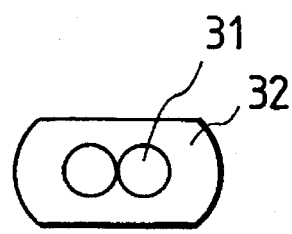
FIGS. 3 are cross-sectional views illustrating multicore coated optical fibers.
Figure 3B:
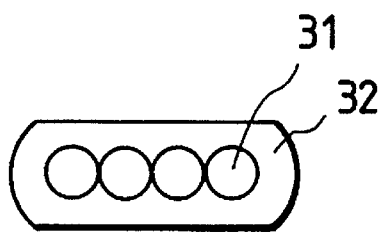
Figure 3C:
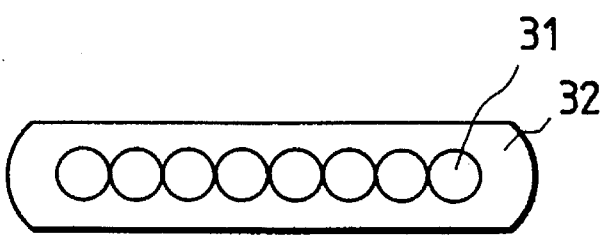

According to an embodiment of the present invention, a multicore coated optical fiber includes a plurality of optical fiber strands that are positioned in a substantially parallel arrangement with one another and are collectively coated with a common coating resin. Referring now to the drawings, and particularly to FIGS. 3(a) through 3(c), a multicore coated optical fiber usually has a structure in which two, four, or eight-core optical fiber strands 31 are collectively coated with a resin coating portion 32. The number of cores may be selected as desired.

Although ultraviolet setting or thermosetting resin is disclosed as the common coating rein according to the present invention, the present invention is not limited in any way by such disclosures.

Figure 1:
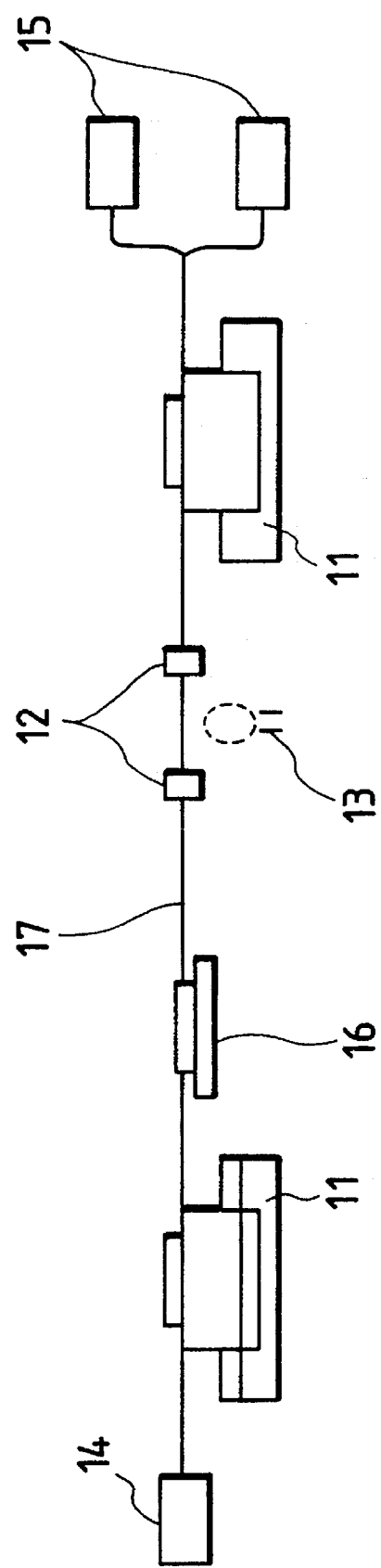
FIG. 1 is a schematic view of a method for producing a multicore optical fiber coupler.

Referring now to FIGS. 1 and 2, a detailed description illustrating a method for producing an optical fiber coupler according to the present invention is provided.

As illustrated in FIG. 1, according to a preferred embodiment of the present invention, production begins by partially removing the respective coating resins of two (i.e., first 17a and second 17b) multicore coated optical fibers 17, thereby exposing the respective glass portions of the respective plurality of optical fiber strands for each of the multicore coated optical fibers 17. The two optical fibers 17 are then arranged such that the first optical fiber 17a is adjacent to (preferably superposed with respect to) and in parallel relation to the second optical fiber 17b. The respective exposed glass portions of the two optical fibers 17 are disposed in the same position along the longitudinal direction of the fibers 17. Optical fiber clampers 12 secure the optical fibers 17 as a micro-torch 13 heats the fixed glass portions of the two optical fibers 17, thereby fusing at least some of the optical fiber strands of the first optical fiber 17a to corresponding optical fiber strands of the second optical fiber 17b. Next, the optical fiber clampers 12 are released and tension (and optionally further heat) is applied to the fused portion of the coupled optical fibers 17. The fused portion of the optical fibers 17 is thereby extended to form a fused and extended region. Reference numerals 11 designate extending stages. While the heating and extending occurs, a light source 14 and a power meter 15 monitor the light branching state of the optical fiber coupler. The extending process ceases when a predetermined branching state is reached.

Next, a reinforcing casing support stage 16 is repositioned at a predetermined position, located substantially adjacent to the fused and extended portion in the extending (longitudinal) direction. An adhesive is then applied to the fused optical fibers 17 and/or the support stage 16 and allowed to hardened, thereby securing the reinforcing basing to the optical fiber coupler. According to the preferred embodiment of the present invention, the adhesive only contacts the non-exposed portions (i.e., the portions retaining the protective coating layer) of the optical fibers 17, and not the exposed optical fiber strands. That is, the coupled optical fibers 17 are adhesion-fixed to the support stage 16 by applying adhesion to the non-extended portions located on the opposite ends of the extended portion in the extending (i.e., longitudinal) direction and the corresponding end portions of the support stage 16. In addition, according to the preferred embodiment of the present invention, before the adhesion is allowed to harden, tension is applied to the non-extending portions of the optical fibers 17 so that each optical fiber strand is pulled taut. The optical fibers 17 may be accommodated on the support stage 16 and pulled taut before adhesive is applied. Alternatively, the adhesive may be applied (but not allowed to dry) before the optical fibers 17 and support stage 16 are brought into contact.

After the adhesive is allowed to dry, the optical fiber strands should be secured in a taut manner to the support stage. Because the fused and extended portions possess a smaller diameter than the non-extended portions (from which the outer coating was not removed), contact between the fused and extended portions and the surface of the support stage 16 is avoided.

Furthermore, according to another preferred embodiment, the adhesion is positioned between the optical fibers 17 and the support stage 16, such that direct contact between the optical fibers 17 (i.e., the exposed portion, non-exposed portions) and the support stage 16 is avoided. By avoiding direct contact between the optical fibers 17 and the support stage 16, the transmission characteristics of the resulting optical fiber coupler are not adversely affected by the reinforcing casing.

Figure 2A:
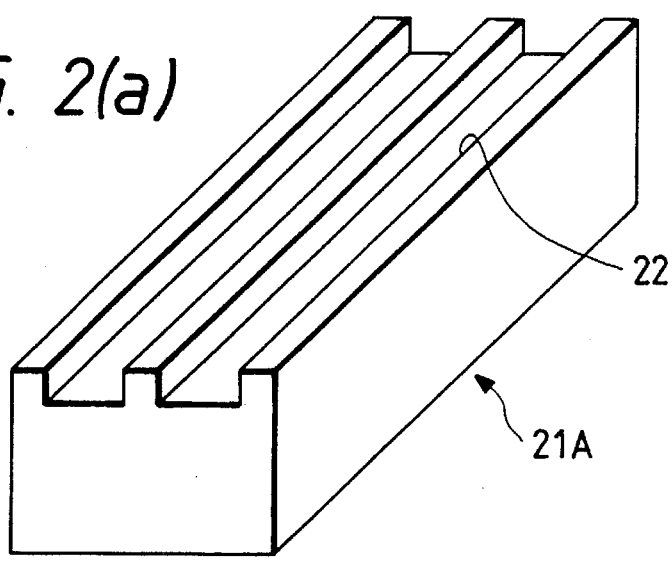
FIGS. 2 are schematic views illustrating the reinforcing casings according to embodiments of the present invention.
Figure 2B:
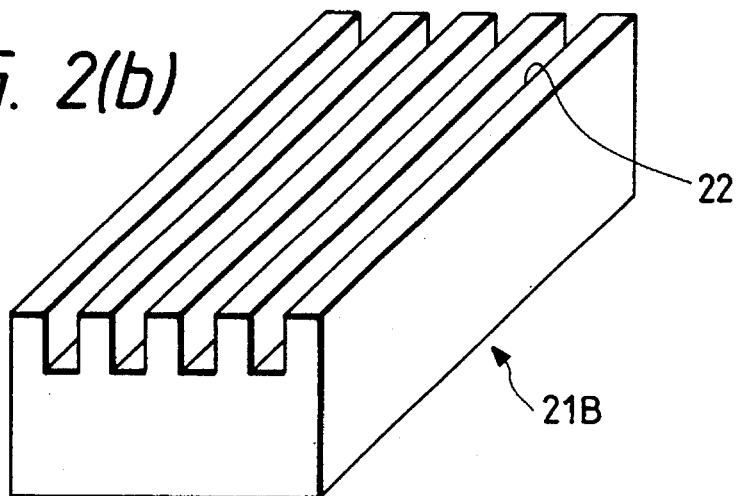
Figure 4A:
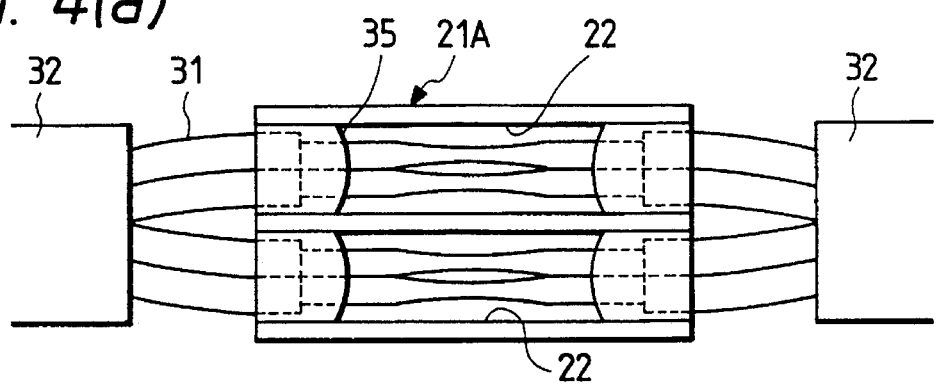
FIGS. 4 are schematic views illustrating multicore coated optical fibers in a molded state.
Figure 4B:
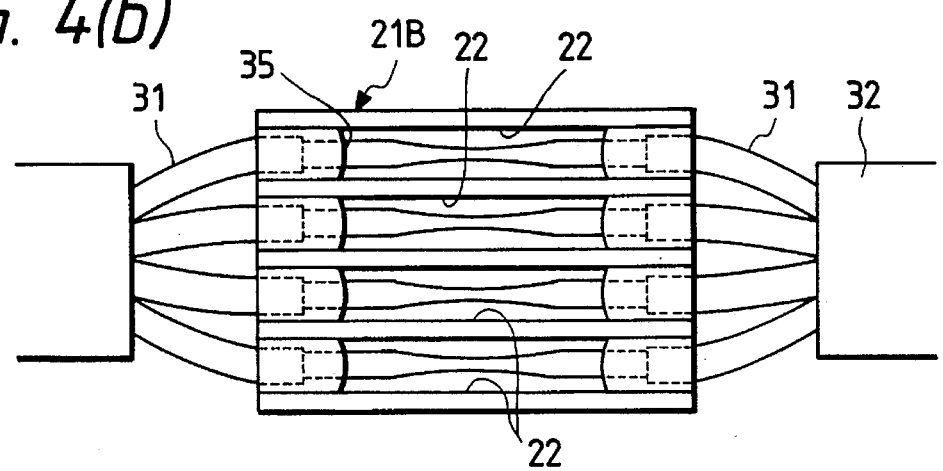

Reinforcing casings 21A and 21B, having a plurality of grooves 22, are illustrated in FIGS. 2(a) and 2(b), respectively. The resin coating portion 32 can be disposed outside (i.e., on opposite ends in the longitudinal direction) of the reinforcing casings 21A and 21B, as illustrated in FIGS. 4(a) and 4(b), respectively.

Figure 2C:
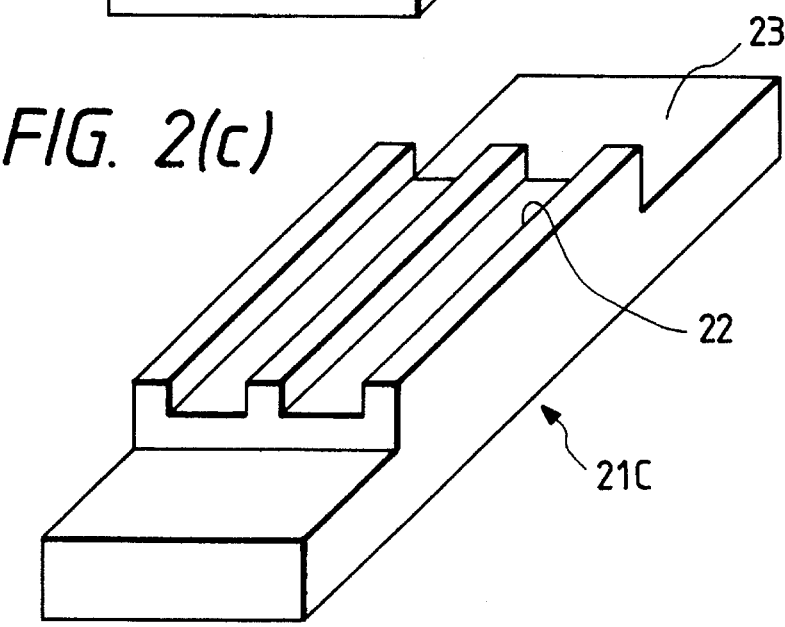
Figure 4C:
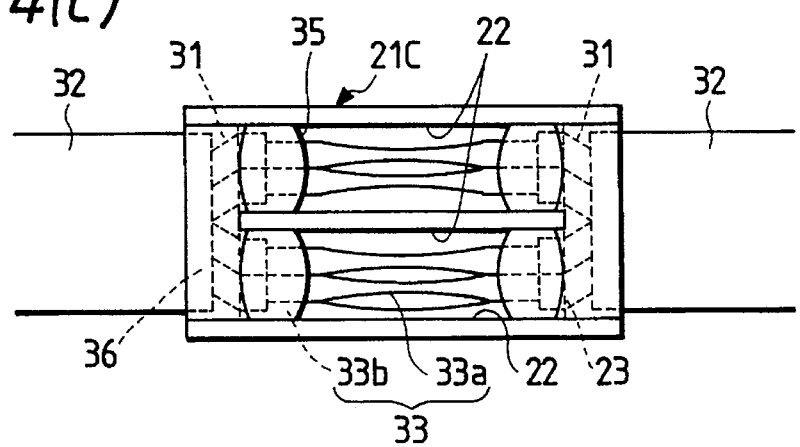

Alternatively, the coating portion 32 can be disposed on or above (via the adhesive) the surface of the reinforcing casing. As shown in FIG. 2(c), a reinforcing casing 21C is configured whereby notched portions 23 are formed to accommodate the non-exposed portion of the optical fiber. The notched portions 23 are positioned so that grooves 22 are provided only in the central portion of the reinforcing casing 21C for receiving the fused and extended optical fiber strands. Referring now to FIG. 4(c), a resin coating portion 32 may be disposed on the surface or outside of the reinforcing casing 21C. However, according to one preferred embodiment, the resin coating portion 32 is disposed on the notched portions 23 of the reinforcing casing 21C, and the exposed optical fiber strands are pulled taut. Adhesive is applied between the resin coating portion 32 and the notched portion 23 of the reinforcing casing for securing the optical fibers in place and for preventing the optical fibers from direct contacting the reinforcing casing 21C.

In the above-described embodiments, the reinforcing casing preferably has substantially the same coefficient of linear expansion as that of an optical fiber. Most preferably, the material's coefficient of linear expansion is no larger than $1\times10^{-5}/°$ C. The reinforcing casing is generally made from quartz, LCP, FRP, Invar alloy, ceramic, crystal glass, or the like material.

Although the disclosure of this patent only makes reference to an ultraviolet setting and a thermosetting adhesive, the present invention is not limited in any way by to such a setting and/or adhesive.

Figure 5A:
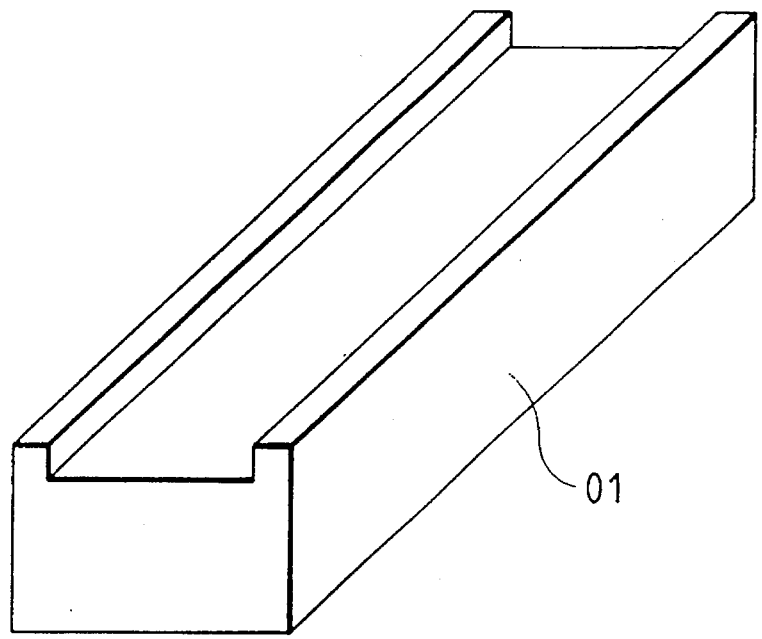
FIGS. 5 are schematic views illustrating a conventional reinforcing casing and its molded state.
Figure 5B:
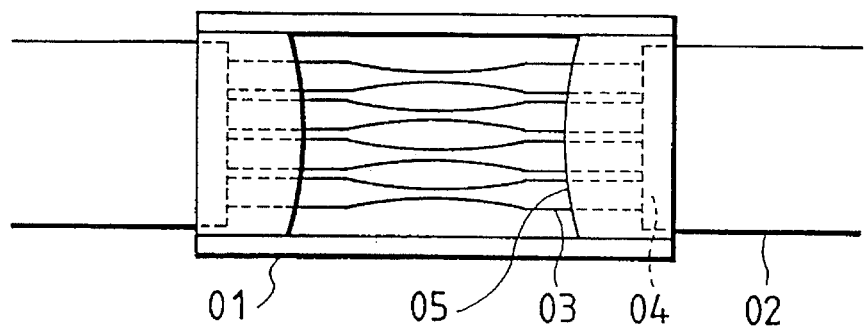

Referring now to FIGS. 5(a) and 5(b), conventional multicore optical fiber couplers are produced by fixing coated optical fibers 02 by using a reinforcing base 01. The optical fibers' non-extended portions 03 and coating portions 04 of the glass portions are fixed by using an adhesive 05. The area occupied by the fixing adhesive is relatively large compared to the size of the reinforcing casing. In addition, the optical fibers 02 are allowed to directly contact the reinforcing base 01.

The large amount of fixing adhesive required in the conventional optical fiber coupler causes complications. The reinforcing casing possesses a coefficient of linear expansion that is equal to or substantially the same as the coefficient of linear expansion of the optical fiber in the casing. However, the coefficient of linear expansion of the fixing adhesive considerably differs from the coefficient of linear expansion of the optical fiber.

External forces—e.g., temperature change, high humidity—can generate stress in the light coupling portion of the optical fiber coupler. Because the fixing adhesive possesses a different coefficient of linear expansion than that of the optical fiber, the stress causes deformation to result in the adhesive. Consequently, deformation of the adhesive can cause a remarkable change in the transmission characteristic of the optical fiber coupler. Moreover, because the optical fiber is in direct contact with the reinforcing casing, stress imparted thereto can further negatively affect the transmission characteristics of the coupler.

According to the present invention, this problem is overcome by decreasing the quantity of adhesive needed by forming a plurality of grooves in the reinforcing casing. The arrangement of the optical fiber coupler thus allows a stable characteristic to be realized, even under external forces such as temperature change and high humidity. Moreover, the absence of contact between the optical fibers and the reinforcing casing (according to the preferred embodiment) improves the transmission characteristics of the coupler.

Descriptions of preferred examples are provided below, showing the effects of the present invention.

EXAMPLES OF PREFERRED EMBODIMENTS

A coupler having a rate of branching of 50% at wavelength of 1.3 μm was produced according to the foregoing method, by using four-core tape-like coated optical fibers wherein four optical fiber strands were coated for each fiber. Each of the four optical fiber strands include a 1.3 μm wavelength single mode fiber having a difference in refractive index of 0.3% between the core and clad, a core diameter of 8μm, and a clad diameter of 125 μm and are coated with a two-layer protective thin film.

FIGS. 4(a), 4(b), and 4(c) are exterior views of Examples 1, 2, and 3, respectively.

EXAMPLE 1

In Example 1, a reinforcing casing 21A having two grooves 22, as represented in FIG. 2(a), was used. A two-core optical fiber strand 31 was accommodated in each of said grooves 22 and fixed by using an ultraviolet setting adhesive 35. The reinforcing casing 21A was made of crystal glass (having a coefficient of linear expansion of $1.5\times10^{-7}$).

EXAMPLE 2

In Example 2, a reinforcing casing 21B having four grooves 22, as represented in FIG. 2(b), was used. A single-core optical fiber strand 31 was accommodated in each of said grooves 22 and fixed by using an ultraviolet setting adhesive 35 in the same manner as shown in Example 1.

EXAMPLE 3

In Example 3, a reinforcing casing 21C having notched portions 23 on the opposite ends, as represented in FIG. 2(c), was used. Non-extended portions 33b on the opposite ends of fused and extended portions 33a of glass portions 33 of a tape-like optical fiber strand 31 were fixed to the reinforcing casing by using an ultraviolet setting adhesive. The tape-like optical fiber strand 31 was fixed, together with the resin coating portions 32, on the notched portions 23 at the opposite end portions of the reinforcing casing 21C where no grooves 22 were formed, by using a soft thermosetting adhesive 36.

COMPARATIVE EXAMPLE

As a comparative example, a coupler was produced wherein a multicore optical fiber coupler was fixed on a reinforcing base 01 having such a conventional structure as shown in FIG. 5(a). The same ultraviolet setting adhesive was used as in the above examples. FIG. 5(b) illustrates an exterior view of the conventional coupler.

TABLE

THERMO-CYCLE TEST VALUATION RESULTS

|  | Example 1 | Example 2 | Example 3 | Comp. Example |
|---|---|---|---|---|
| Change of loss in thermo cycle (dB) |  |  |  |  |
| 1 core | +0.11 | +0.06 | +0.04 | +0.18 |
| 2 cores | +0.06 | +0.13 | +0.06 | +0.38 |
| 3 cores | −0.03 | +0.08 | −0.05 | +1.09 |
| 4 cores | +0.02 | −0.02 | +0.03 | +0.56 |

The Table displays the results of a thermo-cycle test with respect to the above couplers. A numerical figure shows a quantity of change of port insertion loss of one of straight and cross ports where the port insertion loss is larger than the other in the thermo-cycle test. The thermo-cycle was performed between −40 and 85° C.

Each of the couplers produced according to the present invention—i.e., Examples 1, 2, and 3,—displayed a stable characteristic within the range of temperatures of the thermo-cycle. However, a remarkable characteristic change was generated in the conventional coupler—i.e., the comparative example—depending on the temperature of the thermo-cycle.

Although the present invention has been described in detail with reference to its presently preferred embodiment, it will be understood by those of ordinary skill in the art that various modifications and improvements to the present invention are believed to be apparent to one skilled in the art. Accordingly, no limitation upon the invention is intended, except as set forth in the appended claims.

What is claimed is:

1. A reinforced optical fiber coupler, comprising:

a reinforcing casing having a coefficient of linear expansion that is substantially the same as that of quartz, said casing having a plurality of grooves formed therein; and a first multicore coated optical fiber having a plurality of optical fiber strands positioned in a substantially parallel arrangement to each other and collectively coated with a common coating resin to form a longitudinal coating resin, said coating resin being partially stripped to expose a portion of at least one of said optical fiber strands and to provide non-exposed portions located on opposite ends of said exposed portion in the longitudinal direction;

a second multicore coated optical fiber having a plurality of optical fiber strands positioned in a substantially parallel arrangement to each other and collectively coated with a common coating resin to form a longitudinal coating resin, said coating resin being partially stripped to expose a portion of at least one of said optical fiber strands and to provide non-exposed portions located on opposite ends of said exposed portion in the longitudinal direction;

a fused and extended portion having said exposed portion of at least one of said optical fiber strands of said first multicore coated optical fiber fused and extended with said exposed portion of at least one of said optical fiber strands of said second multicore coated optical fiber so that exposed portions of corresponding optical fiber strands are fused and extended; and adhesive for securing said first and second multicore coated optical fibers to said reinforcing casing, said adhesive being positioned to prevent direct contact between said fused and extended portion and said reinforcing casing;

wherein at least one of said corresponding optical fiber strands is accommodated in a respective groove of said reinforcing casing.

2. A reinforced optical fiber coupler as recited in claim 1, wherein said adhesive is positioned to prevent direct contact between said first and second multicore coated optical fibers and said reinforcing casing.

3. A reinforced optical fiber coupler as recited in claim 2, wherein said adhesive does not directly contact said exposed portions of said first and second multicore coated optical fibers.

4. A reinforced optical fiber coupler as recited in claim 3, wherein said adhesive comprises an ultraviolet setting adhesive.

5. A reinforced optical fiber coupler as recited in claim 1, wherein said adhesive is positioned to prevent direct contact between said exposed portions and said reinforcing casing.

6. A reinforced optical fiber coupler, comprising:

a reinforcing casing having a coefficient of linear expansion that is substantially the same as that of quartz, said casing having a plurality of grooves formed therein; and a first multicore coated optical fiber having a plurality of optical fiber strands positioned in a substantially parallel arrangement to each other and collectively coated with a common coating resin to form a longitudinal coating resin, said coating resin being partially stripped to expose a portion of each of said optical fiber strands and to provide non-exposed portions for each of said plurality of optical fiber strands, said non-exposed portions being located on opposite ends of said respective exposed portion in the longitudinal direction;

a second multicore coated optical fiber having a plurality of optical fiber strands positioned in a substantially parallel arrangement to each other and collectively coated with a common coating resin to form a longitudinal coating resin, said coating resin being partially stripped to expose a portion of each of said optical fiber strands and to provide non-exposed portions for each of said plurality of optical fiber strands, said non-exposed portions being located on opposite ends of said respective exposed portion in the longitudinal direction;

a fused and extended portion having said exposed portions of said first multicore coated optical fiber fused and extended with said exposed portions of said second multicore coated optical fiber so that corresponding optical rider strands are fused and extended; and adhesive for securing said first and second multicore coated optical fibers to said reinforcing casing, said adhesive being positioned to prevent direct contact between said fused and extended portion and said reinforcing casing;

wherein said corresponding optical fiber strands are accommodated in said grooves of said reinforcing casing.

7. A reinforced optical fiber coupler as recited in claim 6, wherein said adhesive is positioned to prevent direct contact between said first and second multicore coated optical fibers and said reinforcing casing.

8. A reinforced optical fiber coupler as recited in claim 7, wherein said adhesive does not directly contact said exposed portions of said first and second multicore coated optical fibers.

9. A reinforced optical fiber coupler as recited in claim 8, wherein each of said plurality of corresponding optical fiber strands is accommodated in a respective groove of said reinforcing casing.

10. A reinforced optical fiber coupler as recited in claim 9, wherein said grooves are formed only in a central portion of said reinforcing casing.

11. A reinforced optical fiber coupler as recited in claim 6, wherein said coefficient of linear expansion of said reinforcing casing is not larger than $1 \times 10^{-5}/°$ C.

12. A reinforced optical fiber coupler as recited in claim 11, wherein said casing is made of crystal glass.

13. A reinforced optical fiber coupler as recited in claim 6, wherein said adhesive comprises an ultraviolet setting adhesive.

14. A reinforced optical fiber coupler as recited in claim 6, wherein said adhesive is positioned to prevent direct contact between said exposed portions and said reinforcing casing.

15. A method for producing a reinforced optical fiber coupler comprising the steps of:

partially removing a longitudinal coating resin of a first multicore coated optical, which has a plurality of optical fiber strands positioned in a substantially parallel arrangement to each other and collectively coated with said coating resin, to expose a glass portion of at least one of said optical fiber strands and to provide non-exposed portions located on opposite ends of said exposed glass portion in the longitudinal direction;

partially removing a longitudinal coating resin of a second multicore coated optical, which has a plurality of optical fiber strands positioned in a substantially parallel arrangement to each other and collectively coated with said coating resin, to expose a glass portion of at least one of said optical fiber strands and to provide non-exposed portions located on opposite ends of said exposed glass portion in the longitudinal direction;

fusing and extending in the longitudinal direction exposed glass portions of corresponding optical fiber strands of said first and second multicore coated optical fibers to form a fused and extended portion;

accommodating at least one of said corresponding optical fiber strands in a groove formed in a reinforcing casing having substantially the same coefficient of linear expansion as that of quartz; and applying adhesive to secure said first and second multicore coated optical fibers to said reinforcing casing, said adhesive being positioned to prevent direct contact between said exposed glass portions and said reinforcing casing.

16. A method as recited in claim 15, further comprising the steps of:

partially removing said longitudinal coating resin of said first multicore coated optical to expose said glass portions of each of said optical fiber strands and to provide respective non-exposed portions located on opposite ends of said exposed glass portions in the longitudinal direction; and partially removing said longitudinal coating resin of said second multicore coated optical to expose said glass portions of each of said optical fiber strands and to provide respective non-exposed portions located on opposite ends of said exposed glass portions in the longitudinal direction.

17. A method for producing a reinforced optical fiber coupler comprising the steps of:

partially removing a longitudinal coating resin of a first multicore coated optical, which has a plurality of optical fiber strands positioned in a substantially parallel arrangement to each other and collectively coated with said coating resin, to expose a glass portion of at least one of said optical fiber strands and to provide non-exposed portions located on opposite ends of said exposed glass portion in the longitudinal direction;

partially removing a longitudinal coating resin of a second multicore coated optical, which has a plurality of optical fiber strands positioned in a substantially parallel arrangement to each other and collectively coated with said coating resin, to expose a glass portion of at least one of said optical fiber strands and to provide non-exposed portions located on opposite ends of said exposed glass portion in the longitudinal direction;

fusing and extending in the longitudinal direction exposed glass portions of corresponding optical fiber strands of said first and second multicore coated optical fibers to form a fused and extended portion;

accommodating at least one of said corresponding optical fiber strands in a groove formed in a reinforcing casing having substantially the same coefficient of linear expansion as that of quartz; and applying adhesive to secure said first and second multicore coated optical fibers to said reinforcing casing, said adhesive being applied to prevent direct contact between said first and second multicore coated optical fibers and said reinforcing casing.

18. A method as recited in claim 17, wherein said adhesive does not directly contact said exposed glass portions of said first and second multicore coated optical fibers.

19. A method for producing a reinforced optical fiber coupler comprising the steps of:

partially removing a longitudinal coating resin of first multicore coated optical, which has a plurality of optical fiber strands positioned in a substantially parallel arrangement to each other and collectively coated with said coating resin, to expose glass portions of each of said optical fiber strands and to provide respective non-exposed portions located on opposite ends of said exposed glass portions in the longitudinal direction;

partially removing a longitudinal coating resin of a second multicore coated optical, which has a plurality of optical fiber strands positioned in a substantially parallel arrangement to each other and collectively coated with said coating resin, to expose glass portions of each of said optical fiber strands and to provide respective non-exposed portions located on opposite ends of said exposed glass portions in the longitudinal direction;

fusing and extending in the longitudinal direction exposed glass portions of corresponding optical fiber strands of said first and second multicore coated optical fibers to form respective fused and extended portions;

accommodating at least one of said corresponding optical fiber strands in a groove formed in a reinforcing casing having substantially the same coefficient of linear expansion as that of quartz; and applying adhesive to secure said first and second multicore coated optical fibers to said reinforcing casing, said adhesive being applied to prevent direct contact between said first and second multicore coated optical fibers and said reinforcing casing.

20. A method as recited in claim 19, wherein said adhesive does not directly contact said exposed glass portions of said first and second multicore coated optical fibers.

21. A method as recited in claim 20, wherein each strand of said plurality of optical fiber strands is accommodated in a respective groove of said reinforcing casing.

22. A method as recited in claim 19, wherein said adhesive comprises an ultraviolet setting adhesive.

* * * * *